United States Patent [19]

Ouchi

[11] Patent Number: 5,603,575
[45] Date of Patent: Feb. 18, 1997

[54] ROLLING BEARING UNIT WITH ROTATING SPEED DETECTOR

[75] Inventor: Hideo Ouchi, Fujisawa, Japan

[73] Assignee: NSK Ltd., Tokyo, Japan

[21] Appl. No.: 545,503

[22] Filed: Oct. 19, 1995

[30] Foreign Application Priority Data

Oct. 20, 1994 [JP] Japan .................................... 6-254931

[51] Int. Cl.⁶ ...................................................... F16C 17/24
[52] U.S. Cl. ........................... 384/446; 384/448; 384/486; 384/485; 384/482; 324/174
[58] Field of Search ................................ 384/446, 448, 384/486, 485, 482; 324/174

[56] References Cited

U.S. PATENT DOCUMENTS

| 4,968,156 | 11/1990 | Hajzler . |
| 5,004,358 | 4/1991 | Varvello et al. . |
| 5,231,391 | 7/1993 | Rigaux . |
| 5,381,090 | 1/1995 | Adler et al. . |
| 5,388,916 | 2/1995 | Ohtsuki et al. . |
| 5,492,417 | 2/1996 | Baker et al. ............................. 384/448 |

FOREIGN PATENT DOCUMENTS

| 2558223 | 7/1985 | France . |
| 2618516 | 1/1989 | France . |
| 2698421 | 5/1994 | France . |
| 4231033 | 4/1993 | Germany . |
| 5-87822 | 4/1993 | Japan . |
| 5-87821 | 4/1993 | Japan . |
| 5-264562 | 10/1993 | Japan . |
| 6-46380 | 6/1994 | Japan . |
| 3001766 | 6/1994 | Japan . |
| 6-53974 | 7/1994 | Japan . |
| 6-69848 | 9/1994 | Japan . |

*Primary Examiner*—Lenard A. Footland
*Attorney, Agent, or Firm*—Evenson, McKeown, Edwards & Lenahan, P.L.L.C.

[57] ABSTRACT

A rolling bearing unit with rotating speed detector comprising an inner ring member with an inner ring raceway and a rotatable outer ring member with an outer ring raceway, a plurality of rolling bodies provided between the inner ring raceway and outer ring raceway, an annular, magnetic tone wheel fitted to the outer ring member, a support ring fitted to the axial end of the inner ring member, an annular sensor supported by the support ring so as to be faced to the tone wheel generally in a circumferential direction, the sensor comprising an annular magnetic pole piece, annular permanent magnet and annular coil, so that one end in magnetic orientation of the permanent magnet is placed adjacent to one end portion of the pole piece, while the other end in magnetic orientation is placed magnetically adjacent to the tone wheel, the coil provided adjacent to the pole piece, the tone wheel having cut-outs formed with a uniform pitch in a circumferential direction and faced across a clearance to a portion of the pole piece where the magnetic property changes in a circumferential direction with the same pitch to that of the cut-outs, and an annular member fitted to the outer ring member in a mating relationship with the support ring to prevent the ingress of dust and rainwater into the bearing portion.

9 Claims, 10 Drawing Sheets

ROLLING BEARING UNIT WITH ROTATING SPEED DETECTOR

FIELD OF THE INVENTION

This invention is related to a rolling bearing unit with rotating speed detector to support the wheels of motor-vehicle with respect to the suspension freely rotatably and to detect the rotating speed of the wheels.

BACKGROUND OF THE INVENTION

In order that a wheel of motor-vehicle is rotatably supported with respect to a suspension while the rotating speed of this wheel is detected, so that the anti-lock brake system (ABS) or traction control system (TCS) is controlled, the rolling bearing units with the rotating speed detector as shown for example, in the specification of U.S. Pat. No. 4,968,156 are known in the art.

The rolling bearing unit with rotating speed detector mentioned in the above specification is constituted as shown in FIGS. 9 to 10. Specifically, a pair of inner rings 2a, 2b combined by a connection ring 1 are press fitted over a non-rotating axle or shaft 3. And both of the inner rings 2a, 2b are securely clamped between a holder 4 and a nut 5. On the outer peripheral face of each inner ring 2a, 2b, an inner raceway 6 is formed, respectively.

There is a hub 7 that is an outer ring member rotating in use, and outer raceways 8 in double rows are formed on the inner peripheral face of the hub 7.

And, provided between the outer raceways 8 and the inner raceways 6 are a plurality of rolling elements 9, respectively, by which the hub 7 is supported around the axle or shaft 3 freely rotatable.

The vehicle wheel 10 is fixed to a flange 11 provided on the outer peripheral face of this hub 7.

Furthermore, a core metal 13 of the seal ring 12 is internally fitted into the opening portion of the axially inner end of the above hub 7.

The "axially inner" in the specification means the center side in a widthwise direction when installed in the vehicle.

And a tone wheel 14 is fixed in this core metal 13.

This tone wheel 14 is constituted by a permanent magnet, and has S pole and N pole arranged alternatively in a circumferential direction.

A support ring 15 formed by deep-drawing is fitted and fixed on the axially inner end portion of the inner ring 2a which is positioned on the axially inner side than the inner ring 2b.

The seal ring 12 has a seal member 16 the tip portions of which are provided in sliding contact with the inner peripheral face and axially outer face of the support ring 15 in order to prevent the ingress of dust and rainwater into the install section of the rolling elements 9 mentioned above.

And a sensor 17 is supported and fixed in one part of the above support ring 15, and the detecting portion of this sensor 17 is opposed to the axially inner side face of the above tone wheel 14.

A Hall element or a magnetic resistance element is built in this sensor 17, to detect the change of flow directions of magnetic flux corresponding to the change of the magnetic pole of the permanent magnet of the above tone wheel 14, and to change the output of the sensor 17.

In case of the rolling bearing unit with rotating speed detector, the vehicle wheel fixed in the hub 7 can be freely rotatably supported with reference to the axle or shaft 3 which the inner rings 2 are pressed fitted over.

The sensor 17 is opposed to the side of the tone wheel 14 fixed in the hub 7, and as the hub 7 rotates with rotation of the vehicle wheel, the output of the sensor 17 changes.

The frequency at which the output signal of the sensor 17 changes is proportional to the rotating speed of the vehicle wheel. Accordingly, if the output signal of the sensor 17 is input into controllers (not shown), the rotating speed of the vehicle wheel can be obtained to control the ABS and TCS adequately.

In the prior art construction described above, a construction of the so-called active type is adopted, where the tone wheel 14 comprises a magnet the magnetic pole of which changes alternatingly in a circumferential direction, so that magnetic flux sent into the sensor 17 from the rotation side changes actively.

The main portion of the sensor 17 can be composed by the Hall element, magnetic resistance element etc., so that it is possible to make the sensor 17 compact in size keeping enough its output (the output voltage).

However, the high-temperature durability of the Hall element and the magnetic resistance element is not always enough in the art of state, and besides, the price is high.

That is to say, the sensor 17 which is built in the rolling bearing unit with rotating speed detector is exposed to the high-temperature by the frictional heat in the brake actuation. Consequently the enough heat resistance is required for the Hall element and the magnetic resistance element composing this sensor 17.

On the other hand, in the actual situation, the Hall element and the magnetic resistance element often do not exhibit the heat resistance enough. And, the ones which are superior in heat resistance are expensive. Consequently their costs are increased when enough dependability and durability are secured.

The rolling bearing unit with rotating speed detector of this invention will solve the problems mentioned above.

SUMMARY OF THE INVENTION

A rolling bearing unit with rotating speed detector of the present invention comprises an inner ring member which has an axial end and an outer peripheral face formed with an inner ring raceway and is securely fitted over a stationary shaft, a rotatable outer ring member having an axial end and an inner peripheral face formed with an outer ring raceway, a plurality of rolling bodies provided between the inner ring raceway and outer ring raceway, an annular, magnetic tone wheel securely fitted to the axial end of the outer ring member, a support ring securely fitted to the axial end of the inner ring member, an annular sensor supported by the support ring so as to be faced to the tone wheel generally in a circumferential direction, the tone wheel has a cut-out section in which cut-outs are formed with a uniform pitch in a circumferential direction, so that the cut-out section is faced across a clearance to a portion of the sensor where the magnetic property changes in a circumferential direction with the same pitch to that of the cut-outs, the sensor comprising an annular magnetic pole piece having end portions, an annular permanent magnet having first and second ends in magnetic orientation, so that the first end in magnetic orientation is placed close to or in contact with one of the end portions of the pole piece, while the second end in magnetic orientation is placed magnetically adjacent to the tone wheel, and an annular coil provided adjacent to the pole piece, an annular member fitted to the outer ring member in a mating relationship with the support ring, and an annular, elastic member having a base portion and a tip portion such that the base portion is connected to the annular member while the tip portion is placed generally circumferentially in sliding contact with the support ring or vice versa.

DESCRIPTION OF THE PREFERRED EMBODIMENTS

Figure 1:
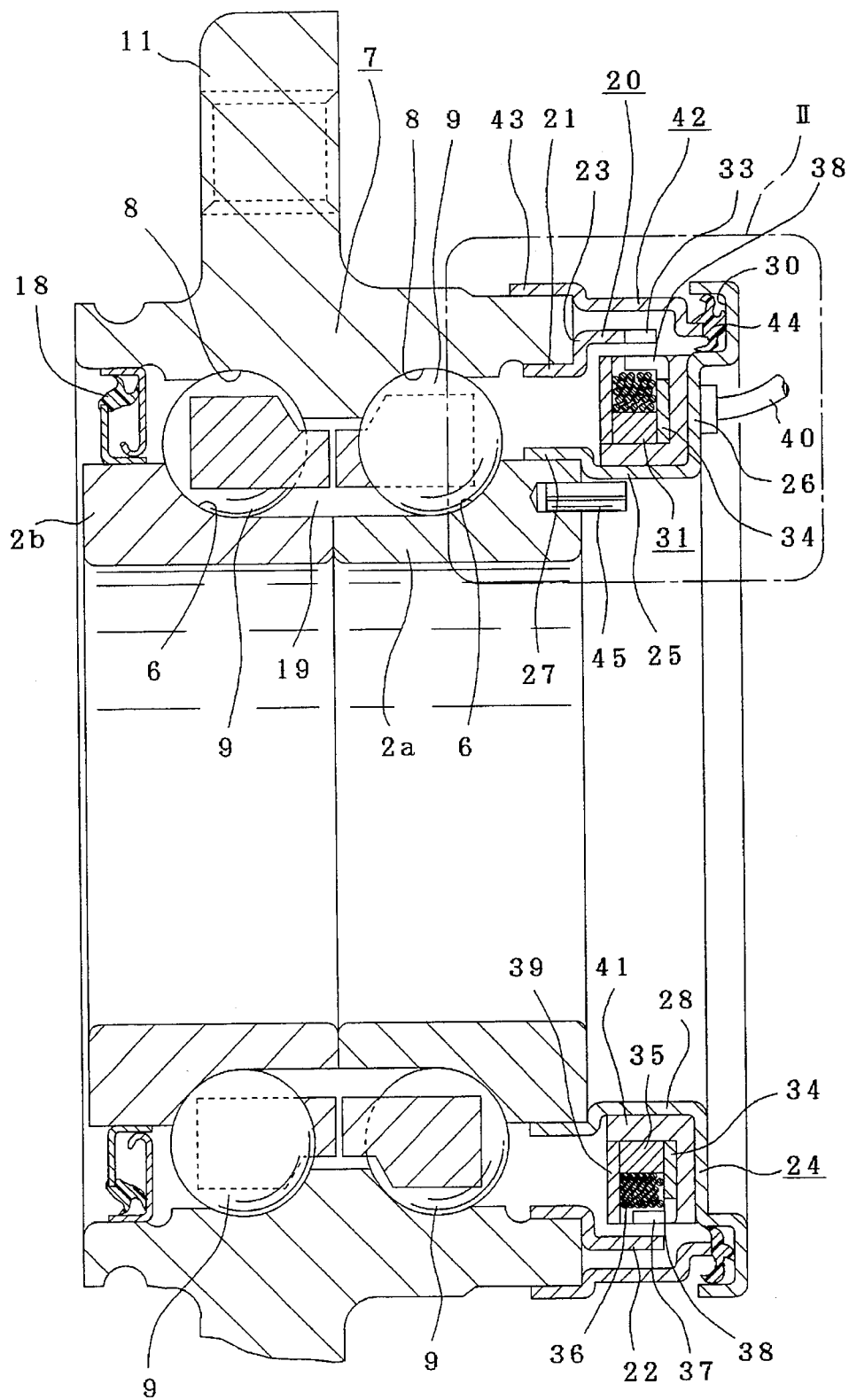
FIG. 1 is a cross sectional view of the rolling bearing unit in a first embodiment of the present invention.

The present invention provides a rolling bearing unit with rotating speed detector comprising an inner ring member that has an inner raceway in its outer peripheral surface and is press fitted over the shaft which dose not rotate during use, an outer ring member that is rotatable during use and has an outer raceway on its inner peripheral surface, a plurality of rolling bodies that are located between the inner raceway and the outer raceway, an annular tone wheel of magnetic material that is fitted to an end portion of the outer ring member, a support ring that is securely fitted over the shoulder portion of the inner ring member, and an annular sensor that is supported by the support ring so as to be faced to the tone wheel around its complete periphery.

And the tone wheel has a cut-out section in which cut-outs are formed with a uniform pitch in a circumferential direction, so that the cut-out section is faced across a clearance to a portion of the sensor where the magnetic property changes in a circumferential direction with the same pitch to that of the cut-outs.

Moreover, the sensor comprises an annular magnetic pole piece having end portions, an annular permanent magnet having first and second ends in magnetic orientation, so that the first end in magnetic orientation is close to or in contact with the one of the end portions of the pole piece, while the second end in magnetic orientation is placed magnetically adjacent to the tone wheel, and an annular coil provided adjacent to the pole piece.

Furthermore, an annular member is fitted to the outer ring member in a mating relationship with the support ring, and an annular, elastic member has a base portion and a tip portion such that the base portion is connected to the annular member while the tip portion is placed in sliding contact with the support ring generally circumferentially or such that the base portion is connected to the support ring while the tip portion is placed generally circumferentially in sliding contact with the annular member.

The operation for freely rotatably supporting the wheel around the shaft or axle by the rolling bearing unit with rotating speed detector of this invention as composed above is similar to the prior rolling bearing unit with rotating speed detector which mentioned previously.

Also, the install section in which the sensor and the tone wheel are provided is separated from the outside by the elastic materials, so that the ingress of dust and rainwater into the install section is prevented.

In particular, in case of the rolling bearing unit with rotating speed detector of this invention, the permanent magnet, the pole piece, the coil which cooperate to compose the sensor are not the members which cause a problem of the heat resistance. Accordingly reliability and durability can be secured sufficiently even if any expensive material is not used for them.

Furthermore, since the sensor is faced to the tone wheel around their complete peripheries, it is possible to increase the sensor output sufficiently. That is to say, the annular sensor is provided to be fitted in an annular space in a portion which is opposed to the faces at one axial end of the inner ring member and the outer ring member so as to utilize the annular space in the portion effectively, and the annular sensor is faced to the tone wheel around their complete peripheries. As a result, the output of the sensor is made larger sufficiently.

Now, some embodiments of the present invention are explained referring to the drawings.

Figure 2:
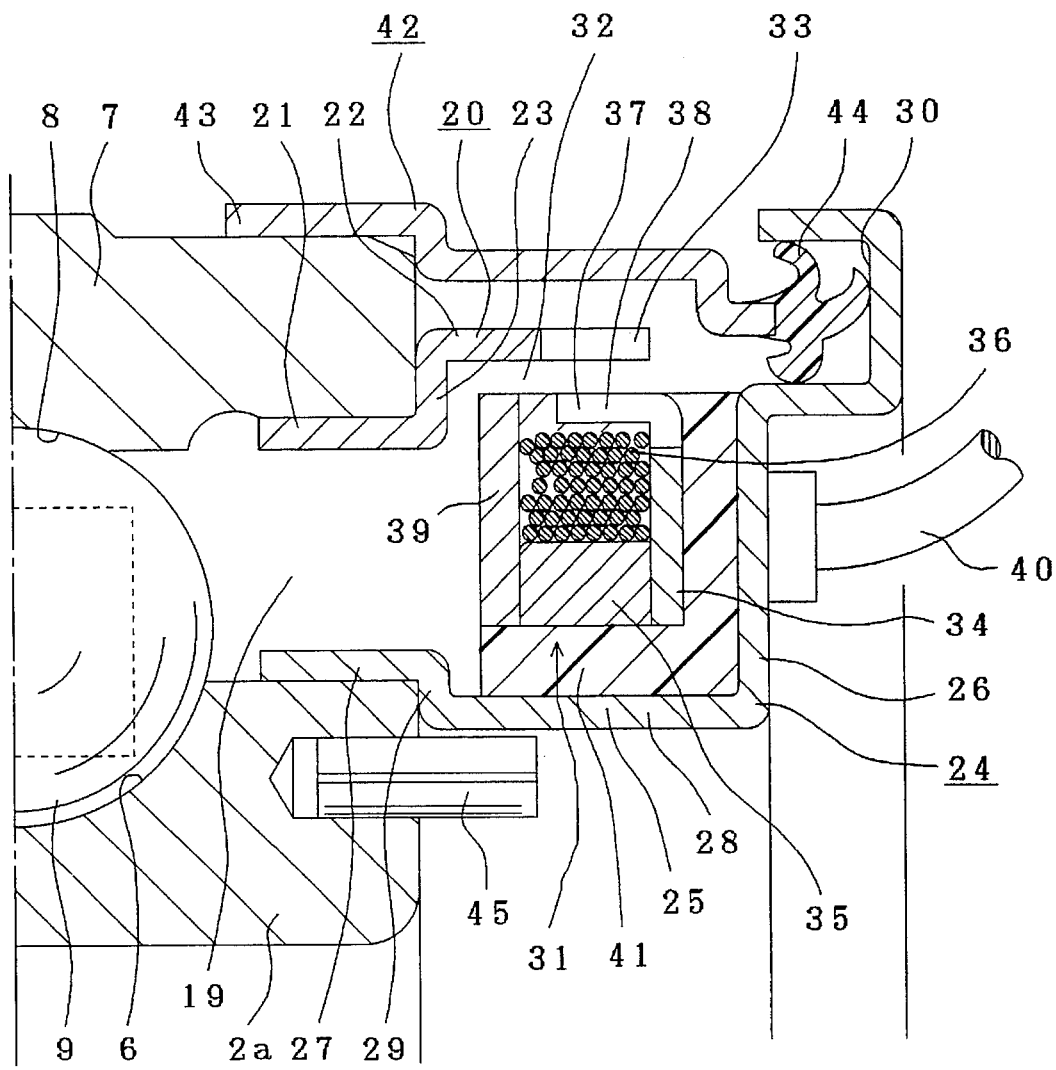
FIG. 2 is an enlarged cross sectional view of the portion II in FIG. 1.

FIGS. 1 and 2 show an embodiment of this invention.

Like the prior art construction as mentioned above, a pair of the inner rings 2a, 2b each having an inner raceway 6 formed on its outer peripheral face can be fitted over the axle 3 (see FIG. 9) which is non-rotating during use.

The hub 7 which is an outer ring member rotatable during use is located in a concentric relation around the inner rings 2a, 2b.

Also, provided between the outer raceways 8 on the inner peripheral face of the hub 7 and the inner raceways 6 are several rolling bodies 9, respectively, which support the hub 7 so as to rotate around the inner rings 2a, 2b.

Incidentally, the balls are used for the rolling bodies 9 in the example of drawings, but the tapered rollers are used in the case of a hub unit for heavy vehicles.

Figure 9:
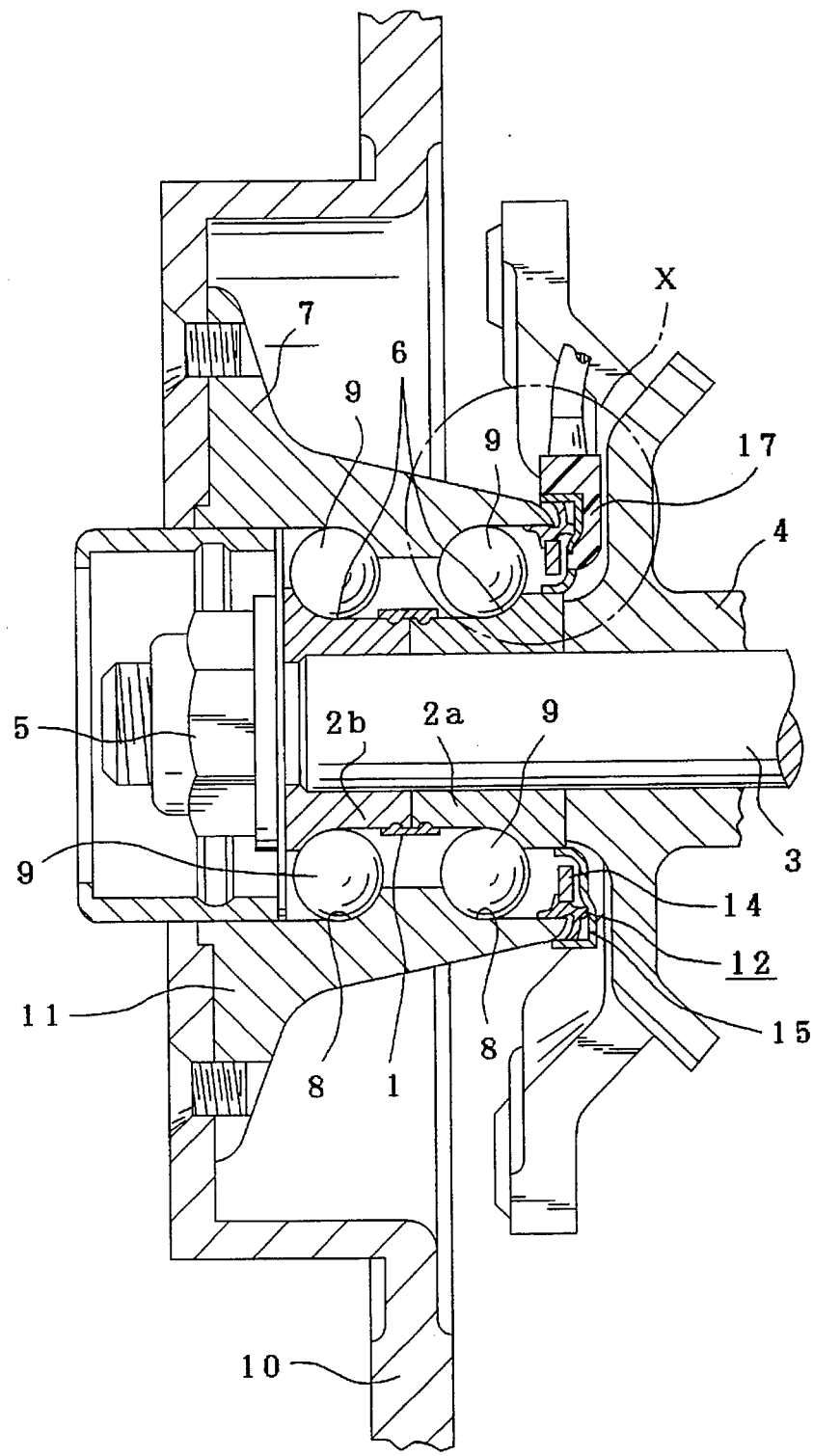
FIG. 9 is a cross sectional view showing an example of the prior art construction.
Figure 10:
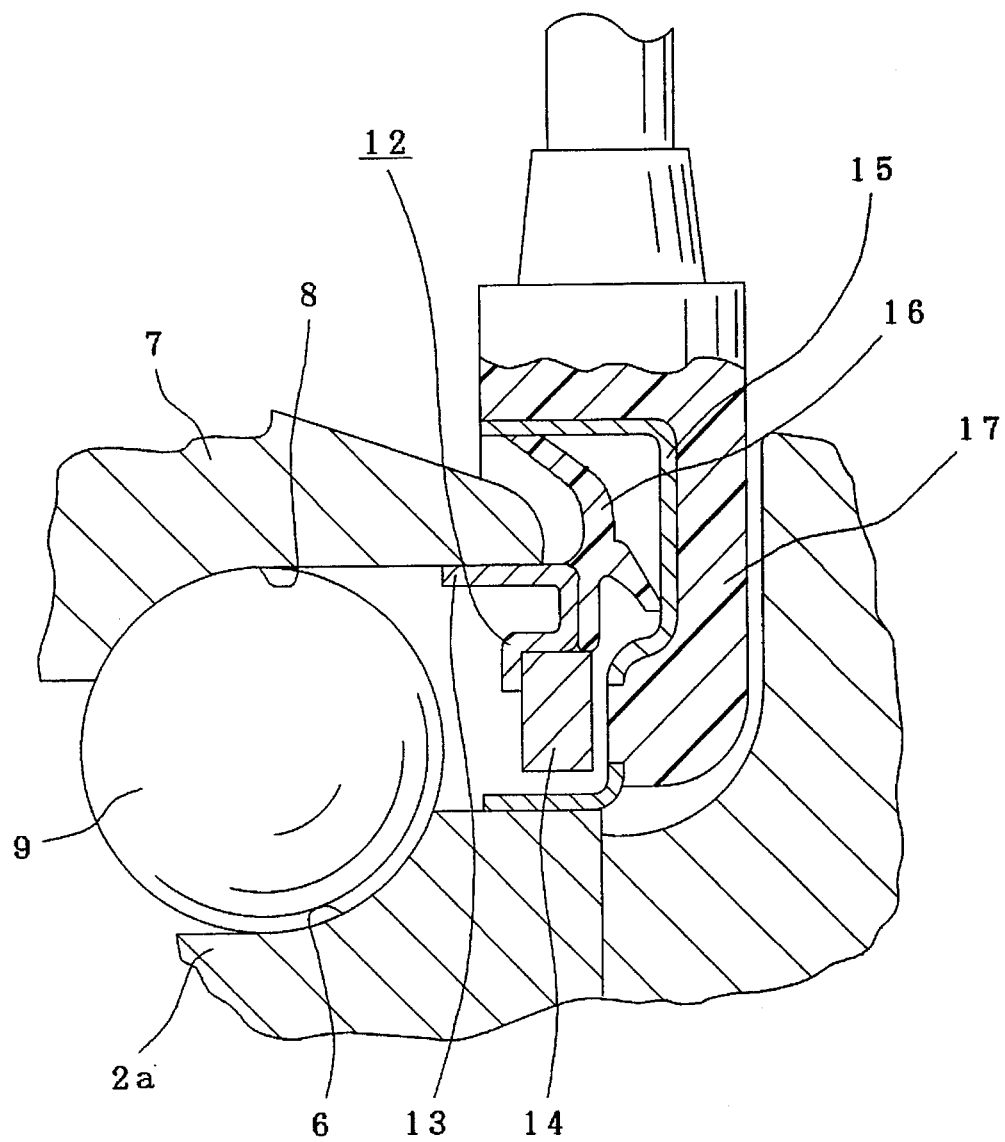
FIG. 10 is an enlarged, cross sectional view of portion X in FIG. 9.

A flange 11 is provided on the outer peripheral face of the hub 7 so as to fasten the vehicle wheel 10 (FIG. 9).

Also, provided between the inner peripheral surface of the axially outer end section of the hub 7 and the outer peripheral surface of the axially outer end section of the outside inner ring 2, is a seal assembly 18 which closes the opening on the axially outside end of the space where the rolling bodies 9 are located.

On the other hand, the tone wheel 20 which is formed from a magnetic material into an annular shape is securely fitted inside the axially inner end portion of the hub 7.

The tone wheel 20, which is formed in an annular shape from a magnetic material such as low carbon steel plate, is formed with a smaller diameter portion 21 and a larger diameter portion 22 connected together by a step portion 23.

Also, the smaller diameter portion 21 is fitted inside the axially inner end portion of the hub 7, so that the step portion 23 is abutted against the axially inner end face of this hub 7.

Accordingly, this tone wheel 20 is fixed on the axially inner end portion of the hub 7 with the condition that its location is regulated.

On the tip half portion of the larger diameter portion 22 of this tone wheel 20 (the right half portion of FIGS. 1 and 2), a plurality of the cutouts 33 that form a first cut-out section are formed with the same pitch in the circumferential direction. Accordingly, the tip half portion of the larger diameter portion 22 is formed in a comb-toothed shape.

Also, the support ring 24 is securely fitted over the axially inner end portion of the inner ring 2a (the right side one of FIG. 1) which defines the shoulder portion of the inner ring member.

The support ring 24 is made from a metal plate such a stainless steel, desirably non-magnetic, through press-forming or deep-drawing in a generally annular shape and in a L-shape in cross-section, so that the support ring 24 has a cylindrical portion 25 and a circular ring portion 26 orthogonal to each other.

This cylindrical portion 25 is formed with the larger diameter portion 27 and the smaller diameter portion 28 connected together by the step portion 29.

Also, the larger diameter portion 27 is fitted over the axially inner end portion of the inner ring 2a, so that the step portion 29 is abutted against the axially inner end face of the inner ring 2a.

Accordingly the support ring 24 is fixed on the axially inner end portion of the inner ring 2a with the condition that its location is regulated.

On the other hand, the outer peripheral portion of the circular ring portion 26 is shaped to form a groove 30 having a C-shape in cross section on its axially outerside around its complete periphery.

The support ring 24 supports the annular sensor 31 on the outer peripheral face of the smaller diameter portion 28 of the cylindrical portion 25.

Also, the outer peripheral face of the sensor 31 is radially faced to the inner peripheral face of the larger diameter portion 22 of the tone wheel 20 around their complete peripheries with a small clearance 32 between them.

The sensor 31 comprises a pole piece 34, a permanent magnet 35 and a coil 36 which are formed in an annular shape, respectively.

The pole piece 34 is formed by press-forming a piece of magnetic metal sheet of low carbon steel and the like, so that it has a L-shaped cross section. Provided on the outer peripheral edge portion of the pole piece 34 is a cylindrical portion 37 the outer peripheral face of which is radially faced to the inner peripheral face of the larger diameter portion 22 of the tone wheel 20 with a small clearance 32 between them.

The cylinder portion 37 is formed with a second cut-out section having a plurality of the cutouts 38 formed with at the same pitch in the circumferential direction. Accordingly, the cylinder portion 37 is formed in a comb-toothed shape. The pitch of cutouts 38 (central angle pitch) is the same to the pitch of cutouts 33 that formed in the tone wheel 20 mentioned above.

Accordingly, with rotation of the above tone wheel 20, all of the cutouts 38 can be faced to all of the cutouts 33 simultaneously.

And the permanent magnet 35 is magnetized in an axial direction (right or left direction in FIGS. 1 and 2).

And, one end (the right end in FIG. 1) in the magnetic orientation of the permanent magnet 35 is in contact with the inner peripheral portion of the axially outer side face (left side face in FIGS. 1 and 2) of the pole piece 34.

And, the other end of the permanent magnet 35 in the magnetic orientation is in contact with the inner peripheral portion of the axially inner side face (right side face in FIGS. 1 and 2) of the auxiliary pole piece 39 annually formed from a piece of magnetic metal sheet.

And the outer peripheral edge of the auxiliary pole piece 39 is faced to the base of the larger diameter portion 22 where the cutouts 33 are not formed and the step portion 23 with a very small clearance 32 between them.

By the auxiliary pole piece 39, the other end in magnetic orientation of the permanent magnet 35 is magnetically adjacent to the tone wheel 20.

And, the coil 36 is wound around a portion surrounded in the three directions by the outer peripheral face of the permanent magnet 35, the axially outer side face of the axially pole piece 34 and the axially inner side face of the auxiliary pole piece 39.

And the voltage generated in this coil 36 can be freely taken out by the harness 40.

Moreover, the sensor 31 is embedded in the synthetic resin 41 which is annularly formed by injection molding with the support ring 24 set in the mold.

Accordingly, the inner peripheral face of the synthetic resin 41 is placed in contact with the outer peripheral face of the smaller diameter portion 28 of the support ring 24 without a gap between them.

Furthermore preferably, the both end faces of the synthetic resin 41 in the axial directions are supported between the circular ring portion 26 of the support ring 24 and the step portion 29.

In this way, it is surely possible to prevent the synthetic resin 41 from slipping with respect to the support ring 24.

Furthermore, there is a seal ring 42, and the base end portion of the seal ring 42 is securely fitted over the outer peripheral face of the axially inner end portion of the hub 7.

The seal ring 42 comprises an annular member or core member 43 which is made of a metal and securely fitted over the hub or outer ring member 7, and an elastic member 44 such as rubber, elastomers and the like which is supported by the tip end portion of the annular member or core member 43 around its complete periphery.

The base end portion of the annular member or core member 43 is securely fitted over the outer peripheral face of the axially inner end portion of the hub 7, while the tip portion of the elastic member 44 is placed in slidingly contact with the inside face of the groove 30 which is formed in the outer peripheral portion of the support ring 24.

The groove 30 functions to keep the sealing of the inside of the support ring 24 from outside by way of the sliding contact of the tip end portion of the elastic member 44, and to augment the strength of the support ring 24 by making larger the cross section modulus of the support ring 24.

The elastic member 44 can be attached to the inner surface of the groove 30 instead of the tip end portion of the annular member or core member 43.

The spring pin 45 protruded from the axially inner end face of the inner ring 2a is engaged with the recesses or notches on the side of the axle or shaft (not shown) so as to prevent the axle or shaft and the inner ring 2a from relatively rotating.

The operation for freely rotatably supporting the vehicle wheel around the axle or shaft by the rolling bearing unit with rotating speed detector of this invention as composed above is similar to the prior rolling bearing unit with rotating speed detector which mentioned above.

Also, the install section in which the sensor 31 and the tone wheel 20 are provided is separated from the outside by the seal ring 42 and the support ring 24, so that the dust and rainwater do not enter into the install section.

In particular, in case of the rolling bearing unit with the rotating speed detector in the embodiment of this invention shown in FIGS. 1 and 2, the tone wheel 20 is formed by providing cutouts 33 in a simple magnetic metal plate. And the annular permanent magnet 35 which composes the sensor 31 is magnetized in the axial direction, such that the magnetic orientation never changes in the circumferential direction. Accordingly, the tone wheel 20 and the permanent magnet 35 are cheap.

And the permanent magnet 35, the pole piece 34, the coil 36 and the auxiliary pole piece 39 in the sensor 31 are not the member which cause a problem of the heat resistance. Accordingly, reliability and durability can be secured sufficiently even if any expensive material is not used.

And the synthetic resin 41 in which the sensor 31 is embedded is provided simply for supporting, but does not take part in functioning, so that the synthetic resin 41 does not cause a problem of the performance even if any expensive material is not used.

Furthermore, since the sensor 31 is faced to the tone wheel 20 around their complete peripheries, it is possible to increase the output of the sensor 31.

In this embodiment, the permanent magnet 35 is provided in the sensor 31 so as not to change its magnetic orientation in a circumferential direction of the sensor 31. The density of magnetic flux flowing through the pole piece 34 changes as the tone wheel 20 rotates. And the electric voltage is induced in this coil 36 corresponding to the change of magnetic flux density. This is referred to as passive-type rotating speed detector, in which the output is lower than the active type rotating speed detector provided that the size of the sensor is equal.

With the construction of this invention, however, the annular sensor 31 is provided to fit in an annular space in a portion which is faced to the faces at one axial end of the inner ring 2a and the hub 7 so as to utilize the annular space in the portion effectively, and the annular sensor 31 is faced to the tone wheel 20 around their complete peripheries. As a result, the output of the sensor 31 is made large sufficiently.

The mechanism that the output of the sensor 31 changes as the tone wheel 20 rotates is described below. As the tone wheel 20 rotates, there are the moments when the cutouts 33 formed in the tone wheel 20 and the cutouts 38 formed in the pole piece 34 are all faced to each other at the same time. At the moment, the tongue-shaped sections located between the adjacent cutouts 33 and the tongue-shaped sections located between the adjacent cutouts 38 are faced to each other. When they are faced to each other, the magnetic resistance value between the tone wheel 20 and the pole piece 34 becomes low. As a result, a great amount of magnetic flux flows through the tongue-shaped sections located between the adjacent cutouts 33 and between the adjacent cutouts 38 into the pole piece 34, so that the density of the magnetic flux becomes high.

In contrast to this state, when the cutouts 33 are half out of phase with reference to the cutouts 38, the tongue-shaped sections located between the adjacent cutouts 33 are faced to the cutouts 38, while at the same time, the tongue-shaped sections located between the adjacent cutouts 38 are faced to the cutouts 33. In this state, the magnetic resistance value flowing between the tone wheel 20 and the pole piece 34 becomes high, and a small amount of magnetic flux flows into the pole piece 34, so that the density of the magnetic flux becomes low.

In this way, as the tone wheel 20 rotates, the density of the magnetic flux flowing into the pole piece 34 changes, so that the voltage is generated in the coil 36 which is located adjacent to the pole piece 34. This voltage changes with a frequency proportional to the rotating speed of the tone wheel 20.

It is desirable that the width of the cutouts 33, 38 is larger than the width of the tongue-shaped sections, so that there is a moment where the tongue-shaped sections between the cutouts 33 are not opposed to any part of the tongue-shaped sections between the cutouts 38 so as to change magnetic flux density greatly.

Figure 3:
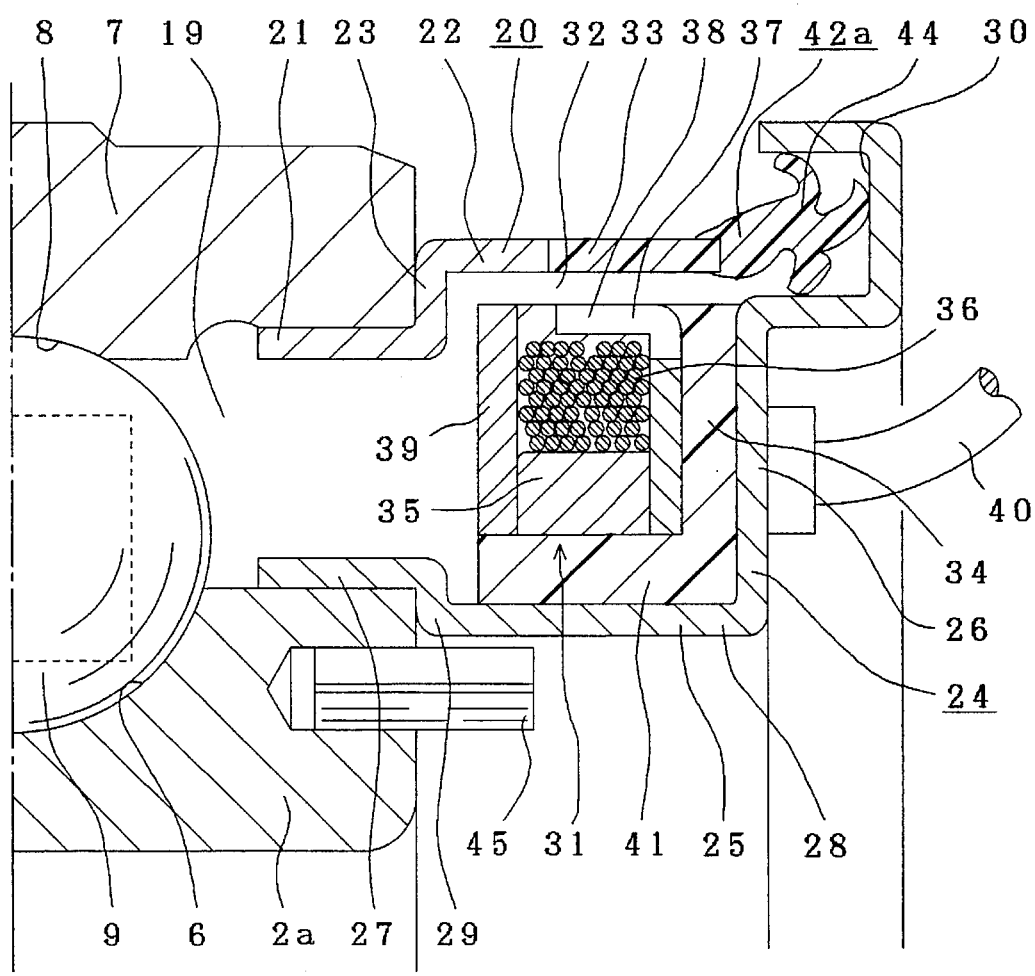
FIG. 3 is an enlarged view similar to FIG. 2, showing a second embodiment of the present invention.

FIG. 3 shows a second embodiment of the present invention.

With this embodiment, the elastic material 44 is attached to the end edge portion of the tone wheel 20 around its complete periphery. The tone wheel 20 functions as the annular member or core member of the seal ring 42a.

The cutouts 33 of the tone wheel 20 are closed by the elastic material 44 so that the ingress of dust and rainwater into the install section through the cutouts 33 is prevented.

With this embodiment, the independent core member is not necessary so that the reduction of the cost can be attempted by the simplification of the production, the control of parts and the assembly operation.

The other construction and operation are substantially the same as in the above described first embodiment.

Figure 4:
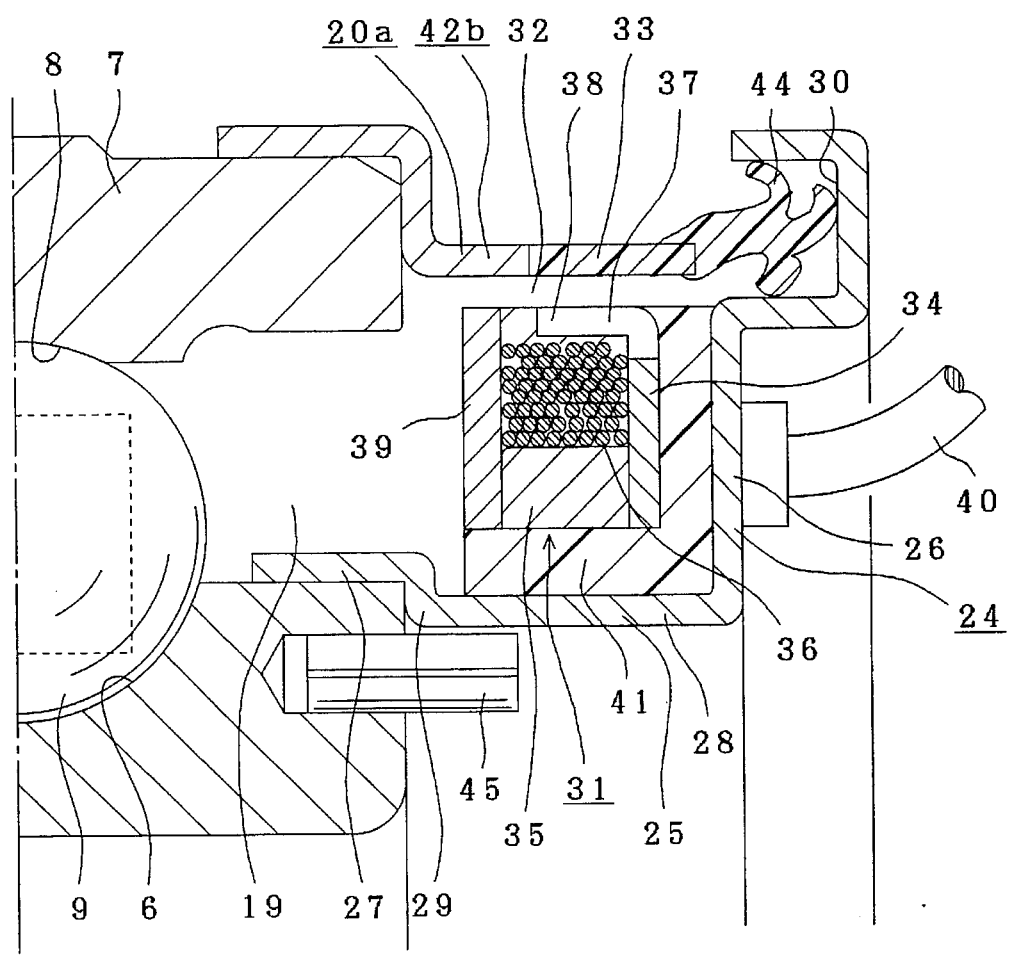
FIG. 4 is an enlarged view similar to FIG. 2, showing a third embodiment of the present invention.

FIG. 4 shows a third embodiment of the present invention.

With this embodiment, the base end portion of the tone wheel 20a is securely fitted over the axially inner end portion of the hub 7.

Also, the elastic material 44 is attached to the tip end portion of the tone wheel 20a around its complete periphery. The tone wheel 20a functions as the core member of the seal ring 42b.

The cutouts 33 of the tone wheel 20a are closed by the elastic material 44 so that the ingress of dust and rainwater into the install section through the cutouts 33 is prevented.

The other construction and operation are substantially the same as in the above described first embodiment.

Figure 5:
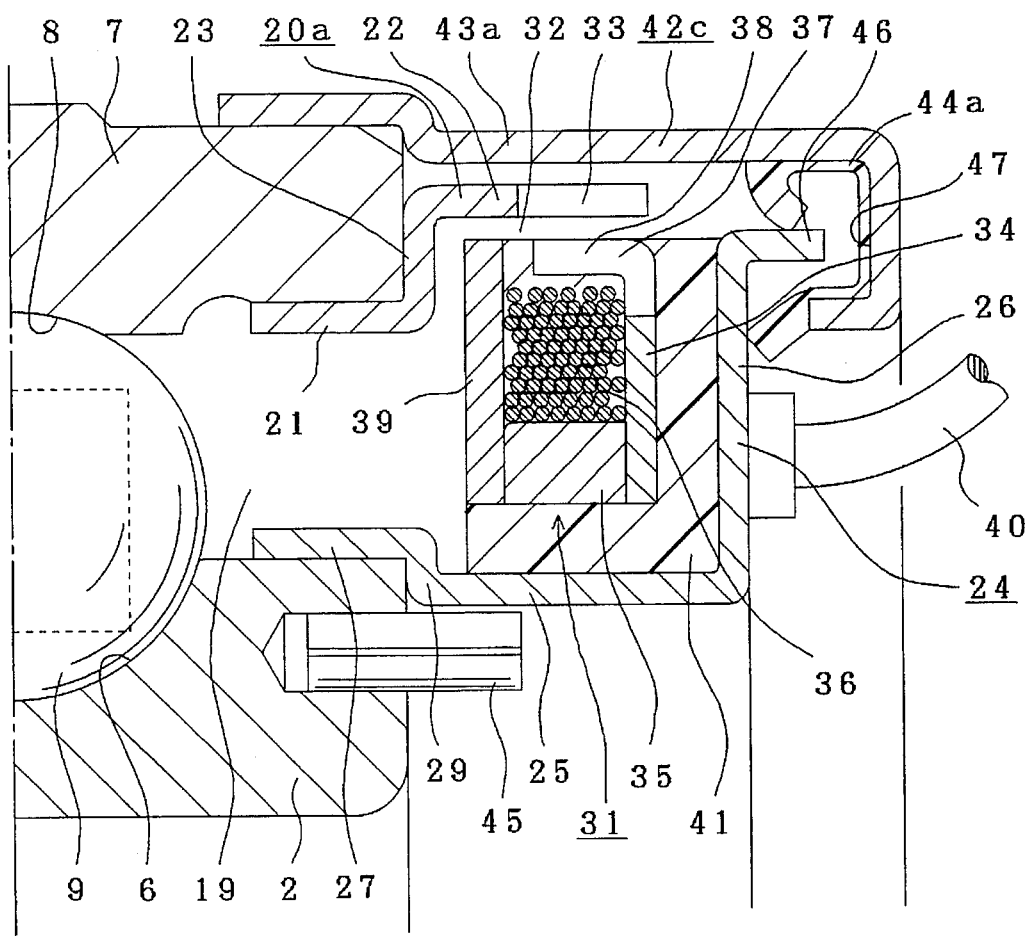
FIG. 5 is an enlarged view similar to FIG. 2, showing a fourth embodiment of the present invention.

FIG. 5 shows a fourth embodiment of the present invention.

With this embodiment, the outer peripheral edge of the circular ring portion 26 of the support ring 24 is formed with the cylindrical projection 46 bent in the axially opposite direction with respect to the cylindrical portion 25.

And a groove 47 is formed by turning radially inwards the end edge portion of the annular member or core member 43a of the seal ring 42c in a channel shape, so that the elastic material 44a is attached to the inside surface of the groove 47 around its complete periphery.

The tip portion of the elastic material 44a is placed in slidingly contact with the outer peripheral face of the cylindrical projection 46 and with the axially inner side face of the circular ring portion 26.

With this embodiment, the core member 43a of the seal ring 42c is fitted over the hub 7 in the last step of the assembly operation.

With this embodiment, the elastic material 44a can be attached to the projection 46 in stead of the inside surface of the groove 47.

The other construction and operation are substantially the same as in the above described first embodiment.

Figure 6:
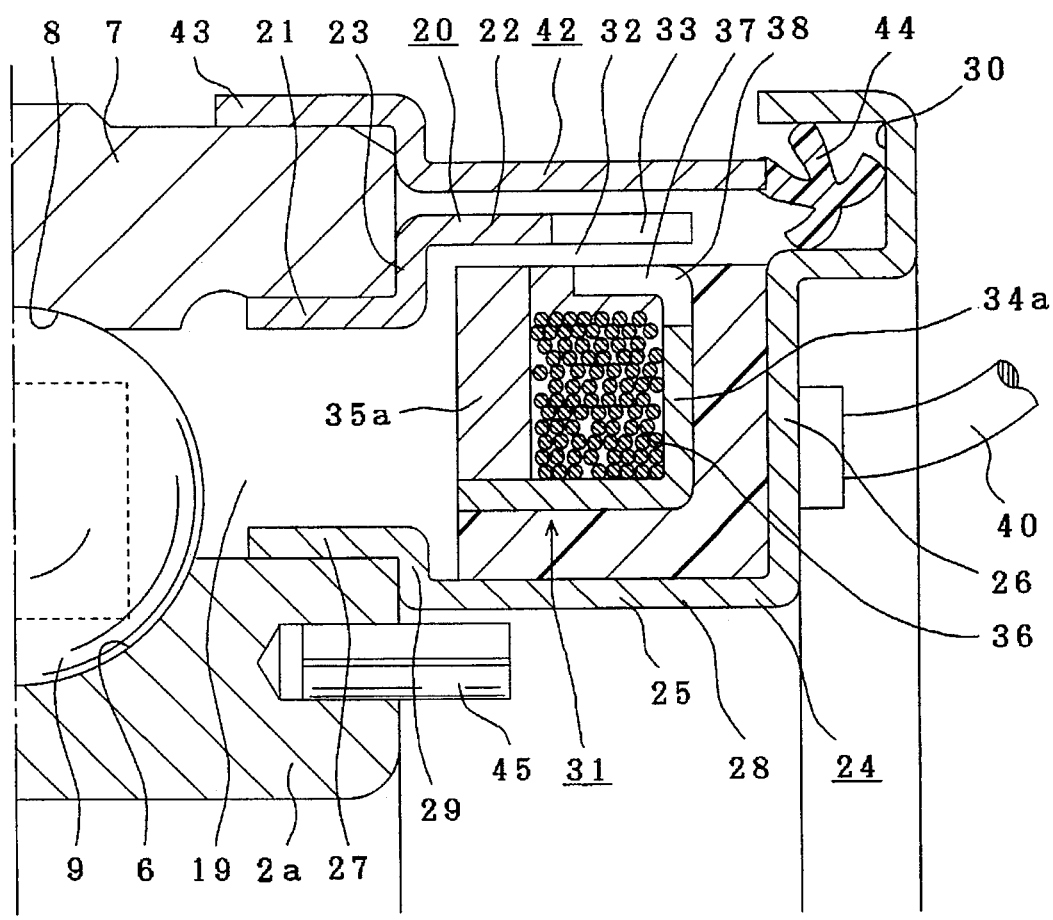
FIG. 6 is an enlarged view similar to FIG. 2, showing a fifth embodiment of the present invention.

FIG. 6 shows a fifth embodiment of the present invention.

With this embodiment, the pole piece 34a of a substantially J-shaped cross section is used instead of adding the auxiliary pole piece 39 in FIGS. 1 to 5.

And the permanent magnet 35a is radially magnetized, and the magnetic poles do not change in the circumferential direction.

Also, the inner peripheral face of the permanent magnet 35a is very near or comes in contact with the one part of the outer peripheral face of the pole piece 34a.

With this embodiment, the outer peripheral face of the permanent magnet 35a is directly magnetically adjacent to the inner peripheral face of the tone wheel 20.

The other construction and operation are substantially the same as in the above described embodiments.

Figure 7:
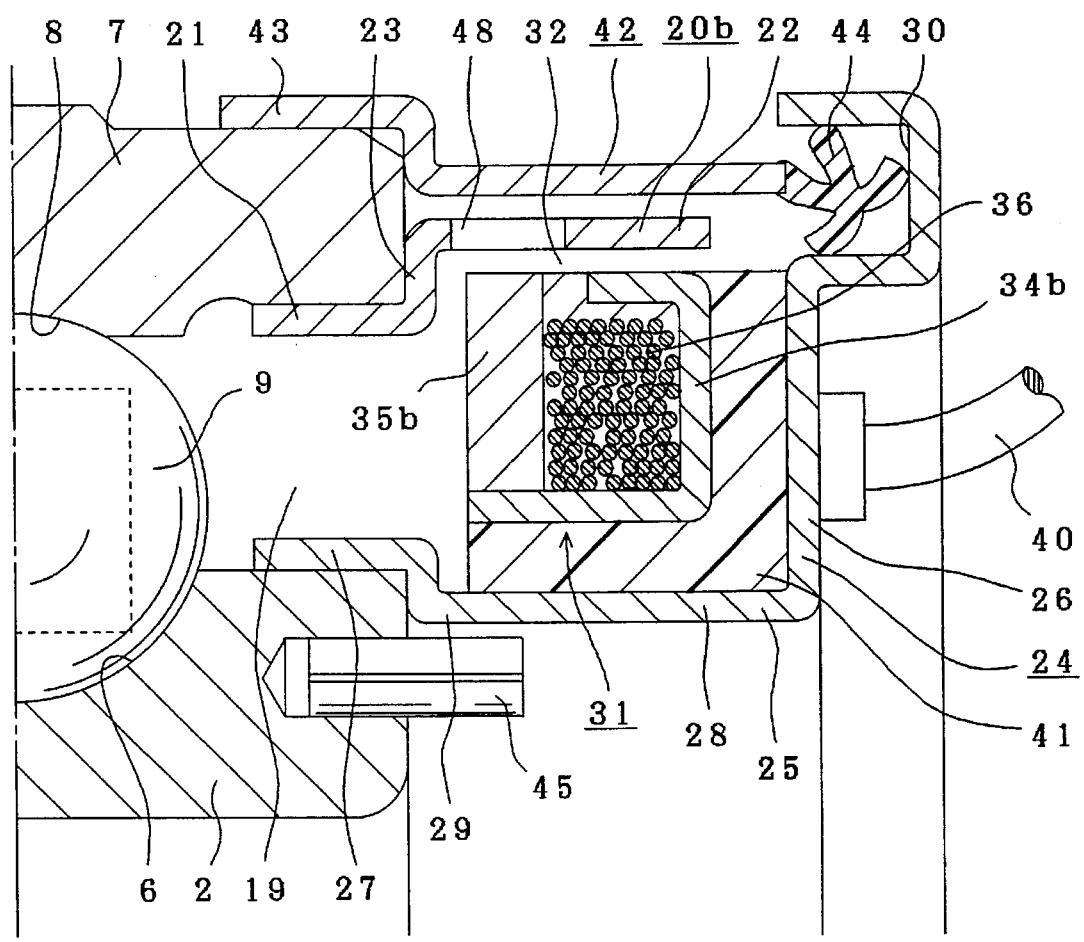
FIG. 7 is an enlarged partial view similar to FIG. 2, showing a sixth embodiment of the present invention.

FIG. 7 shows a sixth embodiment of the present invention.

With this embodiment, the cut-out section is not formed in the pole piece 34b.

One part of the outer peripheral face of the pole piece 34b is faced to the end edge portion of the tone wheel 20b without a break around their complete peripheries.

On the intermediate portion of the tone wheel 20b, a plurality of through holes 48 which form a cut-out section are formed with the same pitch in the circumferential direction.

On the other hand, S pole and N pole are alternately formed on the outer peripheral face of the permanent magnet 35b with the same pitch as the through-holes 48, such that the S pole and N pole are arranged on the outer peripheral face with the reverse phase to those of the inner peripheral face of the magnet 35b.

Accordingly, in the moment when the S poles are all faced to the through-holes 48, the N poles are all faced to the column portions located between the adjacent through-holes 48, and when the N poles are all faced to the holes 48, S poles are all faced to the column portions located between the adjacent through-holes 48.

The magnetic flux flows alternately in opposite directions at the moment when the N poles are all faced to the through-holes 48, and at the moment when the S poles are all faced to the through-holes 48.

As a result, in the coil 36 located adjacent to the pole piece 34b, the voltage is generated alternately in opposite directions.

In this embodiment, the production costs of the permanent magnet 35b increase as compared with the first to fifth embodiments. However, with this embodiment, the output of the sensor 31b increases as compared with the first to fifth embodiments.

Figure 8:
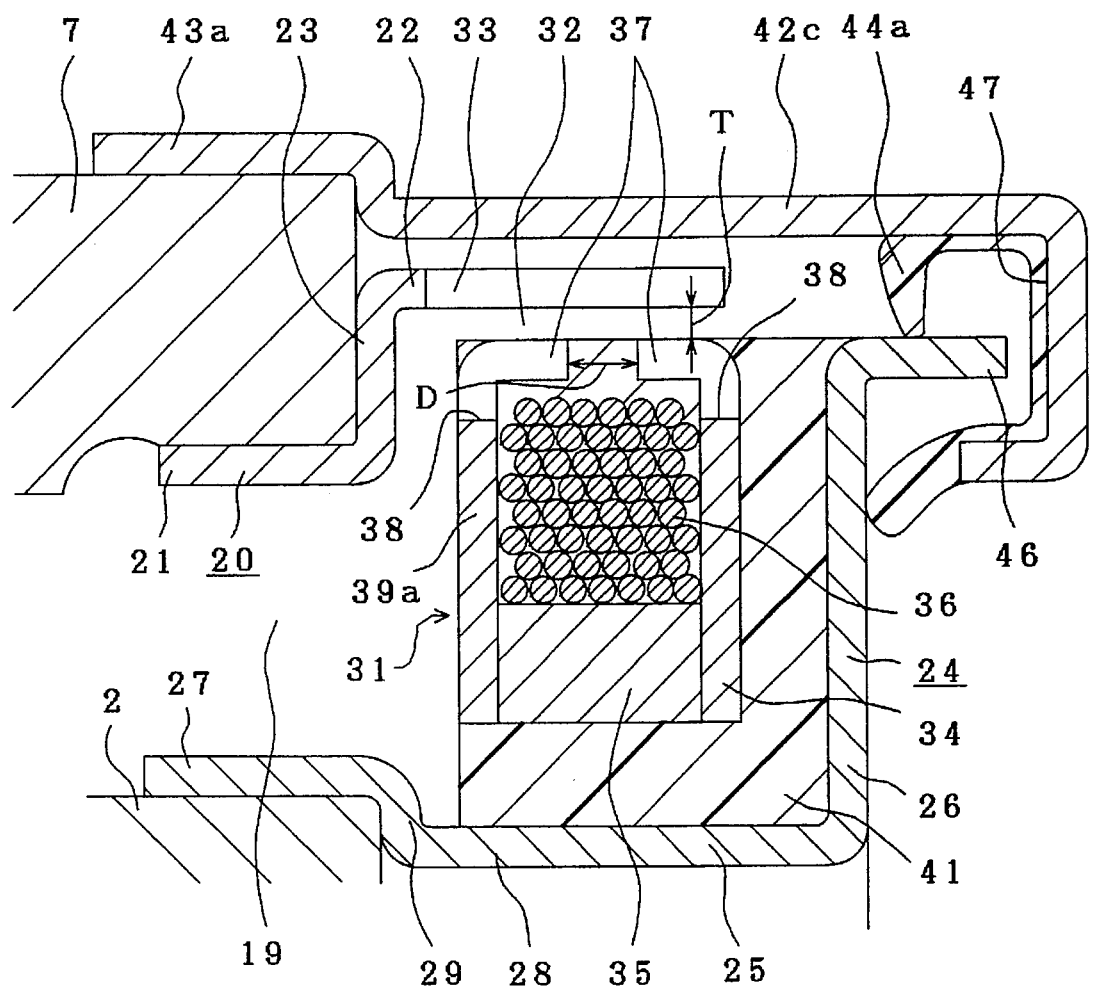
FIG. 8 is an enlarged, cross sectional view showing a seventh embodiment of the present invention.

FIG. 8 shows a seventh embodiment of the present invention.

In case of the present embodiment, the auxiliary pole piece 39a is formed in the same shape as the pole piece 34.

In other word, a pair of pole pieces having the same shape and dimension are disposed in plane symmetry, so that one is provided as the auxiliary pole piece 39a and the other is as the pole piece 34.

The phase of the cutouts 38 formed in the auxiliary pole piece 39a in the circumferential direction is the same to the phase of the cutouts 38 formed in the pole piece 34.

Furthermore, the cutouts 33 formed in the larger diameter portion 22 of the tone wheel 20 is longer in the axial direction than that of the first embodiment.

And the cutouts 33 are faced not only to the cutouts 38 of the pole piece 34 but also to the cutouts 38 of the auxiliary pole piece 39a.

In case of this embodiment constructed as described above, the magnetic resistance following the rotation of the hub 1 changes not only between the pole piece 34 and the tone wheel 20 but also between the auxiliary pole piece 39a and the tone wheel 20.

Accordingly, as the hub 1 rotates, the change of the magnetic flux in the pole piece 34 and the auxiliary pole piece 39a becomes larger, so that the output of sensor 31 can be made larger.

Further, the man-power for the production and inventory of parts is reduced by using common parts for the pole piece 34 and the auxiliary pole piece 39a, so that the cost down can be obtained.

However, with this embodiment, since the cylindrical portions 37 of the pole piece 34 and the auxiliary pole piece 39a are faced to each other, the space D between the tip portions of the both cylindrical portions 37 become narrow.

When the space D becomes too narrow, the magnetic flux directly flowing between the pole piece 34 and the auxiliary pole piece 39a, that is bypassing the tone wheel 20, increases.

The amount of the magnetic flux directly flowing in this way does not change by the rotation of the hub 7, so that the output of the sensor 31 rather falls as the amount of the magnetic flux direct flowing in that way increase.

For preventing the output fall due to such a reason, and for getting effects of the present embodiment, it is desirable that the above space D should be equal to or more than 2.5 times ($D \geq 2.5\,T$) of the width dimension T of the small clearance 32.

When the distance D can not be secured, the outer peripheral portion of the auxiliary pole piece may be formed in a gear-like shape. Specifically, the auxiliary pole piece is formed in a simple flat plate, and the cutouts are formed on the outer peripheral edge of the auxiliary pole piece.

Of course, the phase of the cutouts of the auxiliary pole piece is the same to that of the cutouts 38 of the pole piece 34 in the circumferential direction.

In this case, the cost down by using the common parts is not possible.

For the use of common parts the pole piece 34 may be formed in the flat plate shape with its outer peripheral portion formed in the gear-like shape.

The cylindrical portions 37 can be bent so as to be spaced apart from each other, or can be bent in the same axial direction, so that the end edges of the cylindrical portions 37 do not come close to each other.

When such a construction is adopted, the axial dimension of the sensor is increased, so that it may be impossible to set the sensor in a limited space as in the rolling bearing unit for the compact car. When enough space is available as in the rolling bearing unit with rotating speed detector for large-sized vehicles, this construction can be introduced.

The rolling bearing unit with rotating speed detector of this invention constructed and used as describe above, sufficient reliability and durability are obtained at a low price.

What is claimed is:

1. A rolling bearing unit with rotating speed detector comprising an inner ring member which has an axial end and an outer peripheral face formed with an inner ring raceway and is securely fitted over a stationary shaft, a rotatable outer ring member having an axial end and an inner peripheral face formed with an outer ring raceway, a plurality of rolling bodies provided between the inner ring raceway and outer ring raceway, an annular, magnetic tone wheel securely fitted to the axial end of the outer ring member, a support ring securely fitted to the axial end of the inner ring member, an annular sensor supported by the support ring so as to be faced to the tone wheel generally in a circumferential direction, the tone wheel having a cut-out section in which cut-outs are formed with a uniform pitch in a circumferential direction, so that the cut-out section is faced across a clearance to a portion of the sensor where the magnetic property changes in a circumferential direction with the same pitch to that of the cut-outs, the sensor comprising at least one annular magnetic pole piece, an annular permanent magnet and an annular coil, the at least one magnetic pole piece having end portions, the permanent magnet having first and second ends in magnetic orientation, so that the first end in magnetic orientation is placed adjacent to one of the end portions of the at least one pole piece, while the second end in magnetic orientation is placed magnetically adjacent to the tone wheel, the coil provided adjacent to the at least one pole piece, an annular member fitted to the outer ring member in a mating relationship with the support ring, and an annular, elastic member having a base portion and a tip portion such that the base portion is connected to the annular member while the tip portion is placed generally circumferentially in sliding contact with the support ring.

2. The rolling bearing unit of claim 1, wherein the first end of the magnet in magnetic orientation is placed in contact with the one of the end portions of the pole piece.

3. A rolling bearing unit with rotating speed detector comprising an inner ring member which has an axial end and an outer peripheral face formed with an inner ring raceway and is securely fitted over a stationary shaft, a rotatable outer ring member having an axial end and an inner peripheral face formed with an outer ring raceway, a plurality of rolling bodies provided between the inner ring raceway and outer ring raceway, an annular, magnetic tone wheel securely fitted to the axial end of the outer ring member, a support ring securely fitted to the axial end of the inner ring member, an annular sensor supported by the support ring so as to be faced to the tone wheel generally in a circumferential direction, the sensor comprising an annular magnetic pole piece, annular permanent magnet and annular coil, the magnetic pole piece having end portions, the permanent magnet having first and second ends in magnetic orientation, so that the first end in magnetic orientation is placed adjacent to one of the end portions of the pole piece, while the second end in magnetic orientation is placed magnetically adjacent to the tone wheel, the coil provided adjacent to the pole piece, the tone wheel having a cut-out section in which cut-outs are formed with a uniform pitch in a circumferential direction, so that the cut-out section is faced across a clearance to a portion of the pole piece where the magnetic property changes in a circumferential direction with the same pitch to that of the cut-outs, an annular member fitted to the outer ring member in a mating relationship with the support ring, and an annular, elastic member having a base portion and a tip portion such that the base portion is connected to the annular member while the tip portion is placed generally circumferentially into sliding contact with the support ring.

4. The rolling bearing unit of claim 3, wherein the first end of the magnet in magnetic orientation is placed in contact with the one of the end portions of the pole piece.

5. The rolling bearing unit of claim 1, wherein the first end of the magnet in magnetic orientation is placed close to the one of the end portions of the pole piece.

6. The rolling bearing unit of claim 3, wherein the first end of the magnet in magnetic orientation is placed close to the one of the end portions of the pole piece.

7. The rolling bearing unit of claim 1, wherein said cut-out section of said tone wheel is faced across said clearance to a portion of said annular permanent magnet of said sensor.

8. The rolling bearing unit of claim 7, wherein the first end of the magnet in magnetic orientation is placed in contact with the one of the end portions of the pole piece.

9. The rolling bearing unit of claim 7, wherein the first end of the magnet in magnetic orientation is placed close to the one of the end portions of the pole piece.

* * * * *